April 27, 1965 G. HESSEL 3,180,776
ORNAMENTATION OF PLASTIC ARTICLES
Filed Feb. 15, 1961 3 Sheets-Sheet 1

INVENTOR.
GUSTAV HESSEL
BY
Mestern & Mestern

April 27, 1965 G. HESSEL 3,180,776
ORNAMENTATION OF PLASTIC ARTICLES
Filed Feb. 15, 1961 3 Sheets-Sheet 2

INVENTOR.
GUSTAV HESSEL
BY
Mestern & Mestern

April 27, 1965 G. HESSEL 3,180,776
ORNAMENTATION OF PLASTIC ARTICLES
Filed Feb. 15, 1961 3 Sheets-Sheet 3
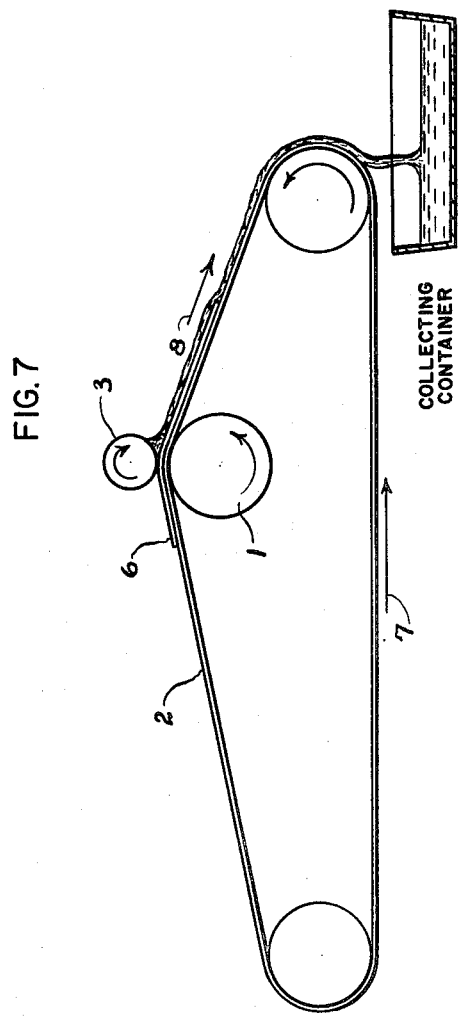
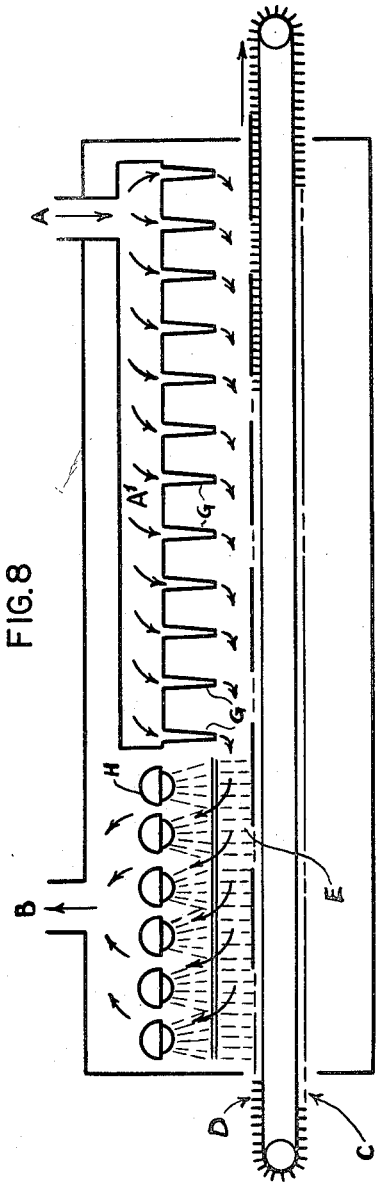
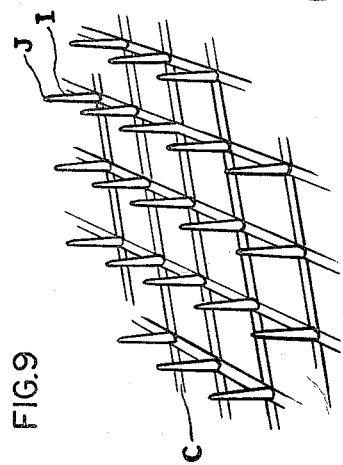
INVENTOR.
GUSTAV HESSEL
BY Mestern & Mestern

United States Patent Office 3,180,776
Patented Apr. 27, 1965

3,180,776
ORNAMENTATION OF PLASTIC ARTICLES
Gustav Hessel, Wald, Zurich, Switzerland, assignor to Ornapress A.G., Zurich, Switzerland
Filed Feb. 15, 1961, Ser. No. 89,390
4 Claims. (Cl. 156—228)

The invention relates to the ornamentation of plastic articles, the manufacture of such ornamented plastic articles and to devices for that manufacture. It is a continuation-in-part of my co-pending application Serial Number 714,468, filed February 11, 1958, and now abandoned, which in turn is a continuation-in-part of my application Serial Number 320,368, filed November 14, 1952, and now abandoned.

More particularly, the invention relates to the application of a surface ornamentation to molded plastic objects, by means of a thin, plastic-ornamented foil, or color support, having specific characteristics, as hereinafter described.

In the course of many years, this inventor has studied and developed the composition and make-up of cellulose and of its most suitable binders, the composition and properties of printing inks, coloring agents and impregnating solutions, the impregnation of color supports and their fabrication, and the molding process to which the color support and the plastic article are to be subjected jointly, and has arrived at an ornamentation which, technologically and esthetically, is beyond reproach, and whereby simultaneously the ornamentation is protected against chemical and mechanical influences. The properties of the finished materials which are of especial importance are governed by the quality and composition of the color support, the quality and characteristics of the coloring agents used for the decoration of the color support, and the very particular method of impregnation of the color support, followed by its drying and molding.

The color support obtained by the combination of specific factors is flexible so that, by means of a special device forming part of this invention, non-planar and/or irregular surfaces can be decorated, for instance deep dishes and bowls, without causing the color support to tear. It also is supple and does not break when molded under the customary conditions; is tear-resistant thus can be printed; is porous; can be saturated with ease since it is absorbent; has wet strength; and is pure.

The printing inks employed for the decoration of the color support must be heat-resistant and resistant to aqueous resin solutions, e.g., they must not "bleed" therein, and must be free of fats or oils, or at least must have a negligible oil or fat content.

In the execution of the invention, the color support is manufactured first. For that purpose, a long-fibered, well-felted alpha-cellulose of at least 96 percent purity is formed into thin sheets of approximately 1 to 8 mils (0.001 to 0.008 inch) thickness, and preferably of approximately 2–5 mils thickness. These sheets are bound with a resin, such as melamine-formaldehyde, urea-formaldehyde or phenol-formaldehyde. It should be pointed out that the latter resin is not necessarily colorless, and, in the interest of absolute freedom from discoloration, the use of melamine-formaldehyde is preferred. To the resin, a catalyst may be added to accelerate the action of the resin. The most important property of the color support is transparency which comes about by the mode of operation, as described below, and by the molding process. This transparency is of importance in such instances in which the surface of the plastic body is to be decorated only in part whereas the remaining portion of that body is to retain the original color of the plastic body. Hence, there must be a complete transparency after completion of the molding process so that the original color of the plastic material is retained or, at least, changed only to a very slight extent, when seen through the resin and filler of the unprinted color support. This is fully attained with the color support according to the invention, and it thus is feasible to lay the printed or decorated side of the support on the precondensed plastic body since the substantially complete transparency after termination of the molding cycle does not detract from the strength of the colors. This inversion of the color support results in a protection of the decoration against chemical and mechanical influences. Since the color support is thus inverted, it is necessary to decorate and/or print the same in mirror image fashion.

The binder for the cellulose fiber, e.g., melamine-formaldehyde, urea-formaldehyde or phenol-formaldehyde, is added thereto in the beater either as a dry power or as an aqueous solution. This manner of binding the fibers is essential because unbound but felted cellulose, such as blotting paper, gives rise to difficulties upon printing and/or impregnation so that such a process becomes uneconomical. When it is attempted to decorate such a blotting paper by printing, cellulose dust develops which soils printing plates, rollers and rubber cylinders whereas, in the ensuing treating of such a color support with an impregnating solution, i.e., while wet, its strength does not suffice for carrying out the process so that the sheet breaks, tears or disintegrates, when the slightest pressure or pull is applied.

The perfect impregnability and plasticity of the cellulose fibers also depends upon the manner of binding them, as described above. The more hardened resin binder is present in the crude color support, the more difficult the later impregnation, and the possibility exists in that case that the quantity of impregnating resin required cannot be incorporated. Care must be taken that the resin content in the cellulose fiber is not less than 1 percent (by weight) in order to enable printing on the sheet, and not more than 4 percent in order not to inhibit impregnation, plasticity and later transparency.

The choice of the printing process depends on the design to be produced and on the quantity. When the book printing, letter press or offset method is to be used, it is mandatory that the colors be free or at least substantially free of fats and oils, be resistant to heat and to aqueous resin solutions, as stated above. This obviates a possible repelling of the impregnant by fatty or oily constituents, as present in the customary printing inks, and the impregnant totally envelops the individual particles of the coloring matter.

The term "free of fats and oils" denotes that no oleo-resinous varnish can be used, i.e., no varnish based on a vegetable or animal oil or fat and/or resins, e.g., alkyds, containing radicals as present in such oils or fats.

The required compositions are attained by manufacturing the inks from pigments which are resistant to phenol-formaldehyde, urea-formaldehyde and melamine-formaldehyde resins, light-fast and resistant to temperatures up to approximately 170° C. The pigment binders consists of hydrophilic substances, such as casein or other protein, alignates, cellulose esters or ethers, or of synthetic hydrophilic binders, such as salts of polyacrylic acids. These can be used alone or in conjunction with aqueous synthetic resin dispersions, further with additives such as moistening agents, e.g., polyvalent alcohols, for instance, glycerol, glycols, mannitol, hexane triol, polyethylene oxide, propylene oxide, or dextrin.

The color support is printed with the above-described inks and then is subjected to a high-frequency field treatment, whereby the inks are hardened and stabilized.

This high-frequency heating treatment comprises heating of the materials with high frequency waves, produced in a tube generator having oscillating circuits from condensers and self-induction spools in the area of $15^5$ to $10^8$ cycles per second or 100 kilocycles per second to 100 megacycles per second.

Induction heating occurs in the magnetic field of a spool. The dielectric or capacitative heating according to the invention takes place in the electrical field of a condenser between two condenser plates. It has been found that when color supports are printed with casein inks and inserted between these plates thus heating the supports, the casein, being present in the form of a salt of an organic base, becomes resistant to aqueous solutions durirng the heating due to liberation of sulfonic acids from the pigments and their acid effects. The fact that the duration of the heating varies with different pigments proves that the different pigments are capable of releasing more or less sulfonic acid.

The printed, dried and cooled color support then is inserted, together with others, in a resin solution and is exposed to a vacuum.

The impregnating resin is a polycondensation resin, consisting of urea-formaldehyde, phenol-formaldehyde or, preferably, melamine-formaldehyde. Solution preferably is accomplished in a proportion of 10:12.5, i.e., 10 kg. resin and 12.5 kg. solvent (water). Added thereto are 0.5–1.0 of a catalyst, preferably chloroacetamide. In an agitator, 9.6 kg. water at 60° C. are added to 10 kg. resin. This is stirred until a clear solution has been obtained. The solution then is cooled, and 1,920 g. of an alcohol are incorporated with constant agitation. This may be methanol, ethanol, propanol or butanol. Cooling of the solution before addition of the alcohol is necessary in order to inhibit condensation of the resin which proceeds rather rapidly at 60° C., and to prevent an undue evaporation of the alcohol.

The admixture of the alcohol is required for the following reasons:

(1) It facilitates a more rapid impregnation;

(2) It provides a more even distribution of the resin in the color support and particularly in the printing inks; and (3) It accelerates the drying process in the drying oven.

The solution thus prepared is allowed to stand for at least 3 hours before use since, during that time, a certain aging process occurs, i.e., only after expiration of that time is the resin completely in solution.

Immediately before use, 960 g. 5 percent chloroacetamide solution are incorporated with agitation for normal color supports, or 960 g. 10 percent solution for heavy duty color supports. The latter have a higher degree of hardness and are used particularly for articles exposed to heavy wear, such as household articles. The impregnating solution then is ready for use.

The printed and dried color supports are immersed singly, i.e., each sheet separately, in the impregnating solution. They are immersed totally, e.g., by means of a broad-surfaced sieve. The immersion of the sheets singly is required in order to attain a rapid saturation and to avoid occlusion of air between the sheets. The vessel containing the impregnating solution and the color supports is put in a vacuum apparatus which then is closed. The assembly is exposed to a vacuum of approximately 600 mm. Hg for 1 to 20 seconds, depending upon the amount of color supports in the solution, their thickness and the density of the print. The vacuum frees the supports from occluded air, and the color supports are completely saturated with the impregnating solution in such a manner that the printing inks are fully enveloped by the resin. Both these features are essential because remaining air inhibits, in the ensuing molding process, a faultless cross-linking of the color support with the pre-condensed piece to be combined therewith, so that the finished product exhibits, in mild cases, lighter-appearing spots and, in aggravated cases, blisters which are prone to break and chip off.

After completion of the impregnation of the color support in the vacuum, the excess resin must be removed and a predetermined uniform amount of resin must remain in the sheet. The resin content of the sheet should be 40–100 percent by weight of the cellulose, and preferably 45–55 percent.

For that purpose, it has been suggested for rotary printing to conduct the impregnated sheet between squeeze rollers. However, it is not feasible to feed single sheets into the squeeze rollers without conveying means. Moreover, neither the weight per square centimeter of the color support nor its quality or kind and size of decoration can find consideration in the process. It has been found that the sheet either retains an excess resin which causes flow; or too little resin whereby the chemical resistance, after molding, is insufficient.

It now has been found that the resin content can be regulated exactly by furnishing the upper squeeze rollers with grooves running at right angles to the axis of the roller.

In the accompanying drawings,

FIG. 7 is a schematic of a squeezing device.

FIG. 8 is a schematic of a drying and hardening oven.

FIG. 9 is a section in perspective of a conveyor through the oven shown in FIG. 8.

Figure 1:
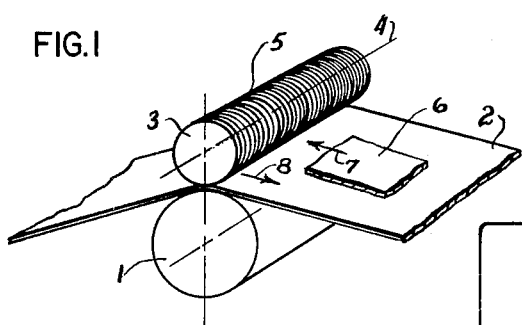
FIG. 1 is a schematic showing the essential parts of a squeeze device.
Figure 2:
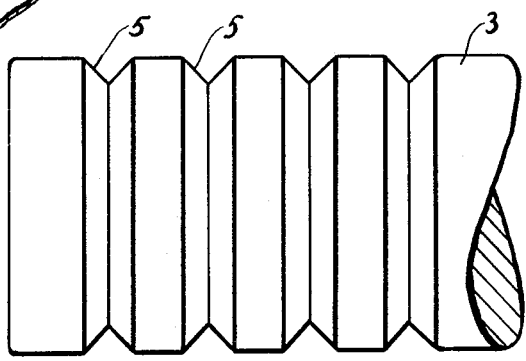
FIG. 2 is a plan view of the grooved upper roller along line 4 of FIG. 1.

Referring now to these drawings, over the lower roller 1, which, e.g., may be of stainless or chromium-plated steel, an endless belt 2 travels. The belt 2 may be made, e.g., of a rubber-coated cotton cloth. The belt is led and moved by rollers (not shown). The upper roller 3 has grooves 5, running at right angles to its axis 4, as is shown particularly in FIG. 2. The color support 6, coming from the impregnating bath, is laid on belt 2 and is conducted in the direction of arrow 7 between the smooth lower roller 1 and the grooved upper roller 3 which is spring-loaded (the springs are not shown). In front of the roller 3, an excess of resin accumulates on belt 2 of which, however, a given quantity, determined by the width and the depth of the grooves 5, is again conducted to the color support 6 while it passes under roller 3. Because too much resin had been removed from color support 6 by squeezing within the area between the grooves 5, the color support again is absorbent in these areas and is capable of absorbing the resin led to it by the grooves 5. In this manner, an extremely exact metering and predetermined resin content of the color support is accomplished. By the tension of the spring acting on the grooved roller and by the depth of the grooves, the resin content can be varied within wide limits. The excess resin flows on belt 2 in the direction of arrow 8 into a collecting container and can be re-used.

In order to keep the color support 6 on belt 2 while traversing the squeeze rollers, i.e., in order to avoid an adhesion of the color support to roller 3 rather than to belt 2, the roller 3 is caused to rotate at a speed approximately 1 percent faster than the speed of belt 2, i.e., roller 3 rotates a little faster than roller 1.

The color support, after leaving belt 2, traverses the drying oven illustrated in FIG. 8. Although it is possible to transfer the color support to the oven by means of a conveying device, this usually is carried out manually because the color support is rather delicate at this stage. Heated air is introduced into air chamber A1 through canal A, flows into chambers E and F, respectively, through jets G, and leaves through canal B after flowing around the infrared lamps H. Travel of the color support, shown as D in FIG. 8, through the oven is accomplished by means of conveyor C. A section of the latter is shown in FIG. 9. The conveyor is provided with pins I which have rounded tips J. The color support rests on these pins rather than on the belt itself, and the pins leave no marks which are visible after molding. Moreover, the drying air is enabled to flow all around the color support instead of merely reaching the upper surface, as would be the case when the support lies flat on the belt. If screens or grates were used in lieu of these pins, the infrared radiation present would cause a charging and ensuing hardening of these portions of the resin in the color support which are in direct contact with the screen or grate. Drying of the color support is carried out, in the first part of the oven, with infrared lamps which are provided with a fine-mesh wire screen as diffusion filter in order to avoid tapered radiation effects. In the second part of the oven, hot air is blown directly on the color supports from flat jets. It has been found that the sole use of infrared drying is not applicable because certain substances have strong absorption in the area having wave lengths of 0.8 A.V., directly adjacent to the spectral area, which are due to auto-oscillations of certain bond systems, such as CH, HO, and others. Such bond systems are present in the majority of the commonly used pigments. These absorb energy, upon infrared radiation, within certain areas of the spectrum, which energy is converted to heat. It furthermore has been found that that absorption depends to a large extent on the color of the pigment and on its density, i.e., the fuller and darker a color, the larger the absorption and, thus, the energy converted to heat.

To the hot air which has circulated in the oven, fresh air is added by means of a mixing system, and saturated air is exhausted from the oven. The combination of infrared and hot air drying accomplishes, in the first drying step, deep drying, i.e., within the color support, and in the second step, surface drying. This avoids an undesirably strong resin flow during the molding step and eliminates occlusion of moisture which might remain in the color support upon mere surface drying. Another advantage of the two-step drying system resides in the fact that any desirable degree of pre-condensation of the resin can be attained, by the use of more or less banks of infrared lamps and by varying the speed with which the conveyor traverses the oven. This is of decisive importance for the ensuing shaping of the color support. Moreover, an undue embrittlement of the color support is averted which would be a drawback for all ensuing operations. Unless the color support is to be pre-shaped, it now is ready for molding.

The make-up and pretreatment of the color support allow its use for ornamenting non-planar and irregular bodies, for instance, deep dishes (soup plates) among others.

Figure 3:
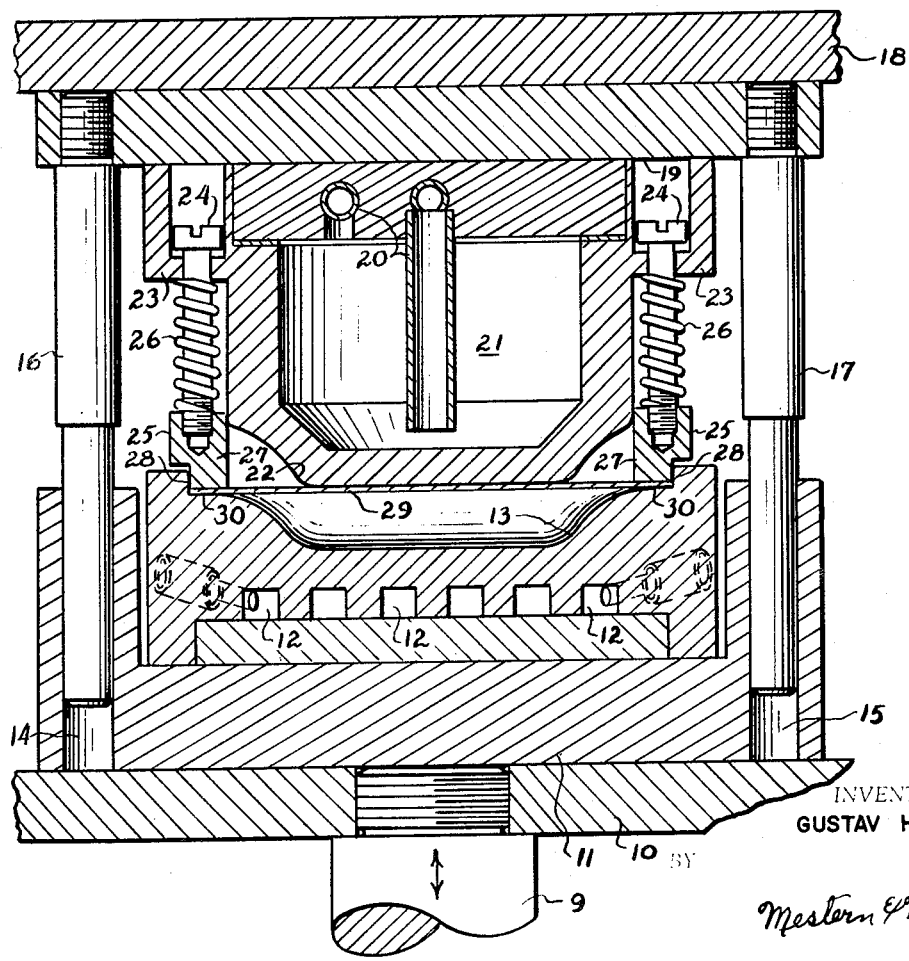

FIG. 3 is a vertical cut through a device for the shaping of the color supports.

The vertically moving piston 9 supports plates 10, 11 which hold the lower die or mold 13 which is heatable by feeding hot water or another heating medium through the conduits 12 in mold 13. Within the cylindrical ducts 14, 15 of plates 10, 11, the rods 16, 17 slide which are fastened to the upper, stationary cover plate 18. Plate 18, in turn, rests on columns which are not shown. On the bottom side of cover plate 18, piston 19 is disposed which has a water-heatable hollow space 21. The water is furnished through pipe 20. Piston 19 also carries the male die 22. Around the circular assembly 19-22, four guide bolts 24 are disposed on a stem 23, placed at 90° from each other, which are screwed into a ring 25 surrounding die 22. The guide bolts carry springs 26 which act on ring 25. The bottom side of the thus spring-loaded ring 25, by means of its recess 27, can rest on the upper and inner recess 28 of mold 13 and is adjusted in such a manner that it is situated a little lower than the lower horizontal limit of die 22 when the machine is open.

When the device is operated, plates 10-12 with mold 13 are lowered, and a printed and resin-impregnated color support 29 is laid into the mold 13. Upon raising plates 10-12, the spring-loaded ring 25 comes to rest on the outer rim 30 of die 22, before the latter touches color support 29, thus securely holding rim 30 in such a manner that, upon further raising of mold 13, the color support is pulled between the heated mold 13 and die 22 without folding or pleating and is shaped to their form under the influence of heat and pressure. Simultaneously, the spring-loaded ring 25 allows applying a certain amount of after-pull on the outer rim of color support 29 so that tearing and similar effects are averted. The time for shaping of the color support, depending on the quality and thickness, ranges between 2 and 20 seconds, the temperature of the heating fluid is 50–60° C.

Figure 4:
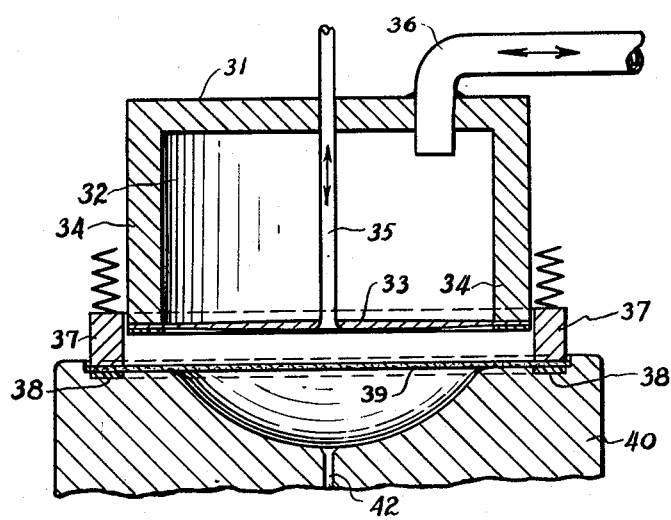
Figure 5:
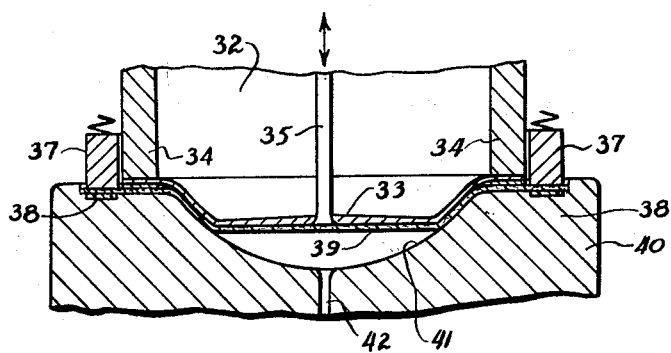
Figure 6:
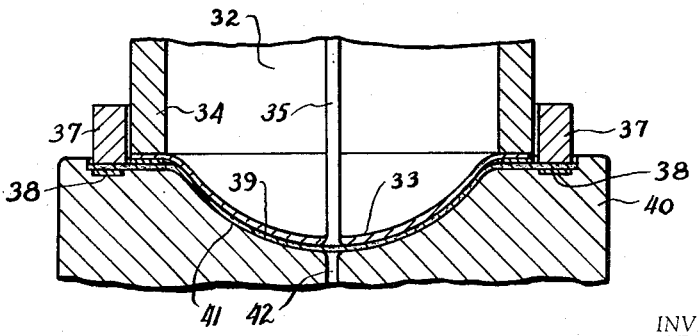

A special embodiment of the shaping or pre-shaping operation is shown in FIG. 4 to 6.

FIG. 4, 5 and 6 are vertical cuts through the mold and die assembly showing different positions of the die.

Piston 31 is not furnished with a solid die, but has a hollow space 32 whose lower end is closed by a membrane or diaphragm 33. The latter tapers toward both rims and is fastened to the lower rim 34 of piston 31. Membrane 33 is punctured in its center by a conduit 35 through which air can be admitted or withdrawn. Pipe 36 facilitates introduction into space 32 of water having a temperature of 50–60° C. in a number of strokes, e.g., by means of a vibration pump (not shown). The frequency of the vibrator can be adjusted by a frequency modulator.

In this embodiment the piston 31–35, which may be circular, also is surrounded by a ring 37 which is spring-loaded. The outer rim of the lower surface of ring 37 firmly secures the color support 39, lying on a plastic insert 38, made, e.g., of Teflon (reg. trademark for polytetrafluoroethylene), to shaping block 40. Mold 41 also is provided, at its lowest point, with an air inlet or outlet, conduit 42.

FIG. 4 shows the initial position of the piston 31. Color support 39 rests on the shaping block 40 and is firmly secured thereto on its rim by the spring-loaded ring 37. Conduits 35 and 42 are in open position, hence, permit the escape of air from between membrane 33 and color support 39 and from between color support 39 and mold 41, respectively. At the instant at which shaping block 40 is moved upwardly and color support 39 is firmly held by the lower ring 37, provided with the Teflon insert 38, i.e., at the instant at which membrane 33 and color support 39 touch each other, water at a temperature of 50–60° C. is introduced into space 32 through conduit 36 by means of a vibration pump in a number of strokes. Since the rim part of membrane 33 is thinner than its center, the strokes exert their greatest strength on the outer rim of color support 39 thus effecting a change in structure, i.e., a loosening of these portions of the color support so that they follow closely the contours of the upper parts of mold 41 without folding or creasing thus allowing a complete and faultless pre-shaping of the color support, as is shown in FIGS. 5 and 6. After termination of the shaping operation of color support 39, conduit 35 is opened so that air can enter, the device can be opened, and shaping block 40 and mold 41 can be lowered without carrying the color support 39 along or damaging the same.

When the piston 19–22, as shown in FIG. 3, is not circular, but is for color supports of other shapes, e.g., rectangular, square or other, ring 25 can be replaced by a frame of corresponding shape. The same is true for the embodiment shown in FIGS. 4–6, where piston 31 can be of non-circular shape and ring 37 can be replaced by a frame of corresponding shape.

After impregnation and drying of the color support, the same has attained a certain amount of brittleness. Before further fabrication, the color support is exposed to moisture, preferably in the form of steam. The steaming again renders the color support flexible and supple.

Thus, it is not required to pre-shape the color support in order to fit it to a pre-condensed plastic body when the latter's spherical shape is comparatively slight, without breaking or folding.

The color support now is in a condensation stage which is called "pre-condensation" or often is referred to as the "B-stage." Before pre-condensation, the resin is said to be in the "A-stage" and, after final condensation, is in the "C-stage." This nomenclature applies to condensation resins, especially to phenol-formaldehyde, urea-formaldehyde and melamine-formaldehyde resins. In the B-stage, the resins are incompletely cured and are soluble and fusible, in contrast to the C-stage, wherein the resins have become insoluble and infusible. It should also be pointed out that the three resins named above are miscible with each other in all proportions in the A-stage and can be combined without difficulty in the B-stage, e.g., a solution of one of these in the B-stage with any other in the B-stage also is miscible in all proportions. The resins can also be combined by molding them together in the B-stage so that they attain the C-stage jointly thus forming an indivisible unit. Therefore, it is feasible to use, e.g., a phenol-formaldehyde impregnated color support on a blank made from urea-formaldehyde, or to use any other combination.

From a thermosetting molding powder, consisting of one of the three resins named above, preferably of melamine-formaldehyde, containing a filler, a blank having the final shape now is molded to the B-stage. The molding powder preferably contains a filler, such as cellulose, sawdust, stone meal, glass- or textile-fibers or others. The condensation of the resin is interrupted at the B-stage, and the flexible printed and decorated color support, which may have been pre-shaped, is laid on the blank with the decoration facing the blank. The color support can have as impregnant the same resin as the blank or any of the ones named above. The mold is closed again, and condensation is resumed to the C-stage of both color support and blank. Through the molding process, the color support becomes an integral part of the blank. The melamine- or other resin, used for the impregnation of the color support mixes and cross-links with the material of which the mold is made. After termination of the molding cycle, i.e., the condensation, the color support cannot be removed from the blank but forms a single unit therewith. It also has become fully transparent, hence, invisible. It cannot be discerned as a separate part, which it no longer is, and it has been established that the coloring matter is completely enveloped in the resin. Therefore, blank, color support and color have become a homogeneous, indivisible unit.

In a special embodiment, the impregnation of the color support can be carried out with an aqueous solution of one of the resins named, but without a catalyst. The condensation of the color support is carried to a certain extent, and then a catalyst, e.g., formic acid in steam, is incorporated. This is of importance in certain instances in order to assure that at a comparatively high drying temperature the B-stage is not exceeded since this would forestall a pre-shaping and a combination with the blank. The steam-treatment of the color support hastens the condensation due to the heat developed during molding. By the incorporation of the catalyst to the impregnated and precondensed color support, the time required for the combination of the latter with the blank can be shortened considerably. Furthermore, the variation of the proportions of catalyst to impregnating resin facilitates a variation of the surface properties of the finished article, especially of the gloss which can be increased to such an extent that polishing of the finished article becomes unnecessary.

After the impregnation but before complete drying, the color support can be creped, rippled or corrugated in order to create a reserve for a deep-drawing process or for ensuing spherical shaping. In the course of such shaping, the places on which a dearth of material occurs, elongate whereas the color support compresses or packs in those places where sufficient material is present.

When the impregnant for the color support is a melamine resin and the blank to which it is to be supplied consists of a chemically less resistant resin, the decorated side of the finished article, i.e., the side covered by the color support, acquires a surface which corresponds to the chemical and mechanical properties of an article made from a melamine resin molding powder.

For the manufacture of single pieces or for experimental pieces, the color support can be decorated by pencil, carbon or crayon or can be painted with water-soluble colors.

The term "decoration" as used in this specification and in the claims denotes the application of print, single- or multicolor pictures, ornaments, drawings, writing and the combination of any of these to the color support.

In the following, an example for the production of an ornamented article is given. However, it should be understood that this is presented merely by way of explanation, not of limitation, and that numerous changes may be made in the details without departing from the spirit and the scope of the invention as hereinafter claimed.

*Example*

A finished ornamented article is manufactured as follows:

The molding material may be in form of a powder, granulate or any other available shape. It may consist of phenol-formaldehyde, urea-formaldehyde or, in this example, of melamine-formaldehyde. The suitable amount of filler, e.g., cellulose, is added, and this mixture is entered in the molding machine or press, which then is closed. Under the influence of heat and pressure, the material to be molded converts into a viscous-plastic mass. The resin flow substantially is terminated after 30 seconds, and a certain amount of condensation has occurred. The blank now has attained its final shape but still remains in the B-stage. The press then is opened, and the color support which had been remoistened, as described above, is laid on the blank with the decoration facing the same. The press again is closed, heat and pressure applied for 2–3 minutes and the article removed from the press. It is deburred, cleaned and polished and then is ready for use.

During the second cycle, i.e., after the color support had been laid on the blank, heat and pressure cause a complete combination of the two items, so that the finished article, in the case of using melamine resin both for the blank and as impregnant for the color support, consists solely of melamine resin, cellulose and pigments, which form an integral and indivisible unit. If urea-formaldehyde or phenol-formaldehyde, respectively, are used for both the above purposes, the unit would consist of one of these resins, cellulose and pigments. If one of these resins is used for the blank and one of the others as impregnant, a mixture of resins would be present, but the unit still would be indivisible and an integral body, the resins being completely miscible.

I claim as my invention:

1. A process for ornamenting molded plastic objects having planar, non-planar and irregular shapes, which comprises printing decorations on a color support manufactured from long-fibered, well-felted alpha-cellulose of at least 96 percent purity, which had been brought into a sheet of 1 to 8 mils thickness by a binder, selected from the group consisting of phenol-formaldehyde, urea-formaldehyde and melamine-formaldehyde, in an amount of 1 to 4 percent by weight of said cellulose; printing being carried out with printing inks made of a vehicle consisting of aqueous solutions of a compound selected from the group consisting of protein, alignates, cellulose esters, cellulose ethers and salts of polyacrylic acids, and of pigments resistant to temperatures up to 170° C. and insoluble in aqueous resin solutions; the sheet thus printed serving as a color support; heating said printed sheet in a high-frequency field of 100 kilocycles per second to 100 megacycles per second to harden and stabilize said inks and to enhance their adhesion to the color support; immersing said printed color support in an impregnant made of a resin selected from the group consisting of phenol-formaldehyde, urea-formaldehyde and melamine-formaldehyde in water in proportions of 10:12.5 by weight, to which solution approximately 10 percent by weight of a monovalent, water-miscible alcohol is added; squeezing resin in excess of 40 to 100 percent by weight, calculated on the cellulose, off said color support; eliminating any air entrapped in said color support by subjecting the same to a vacuum of approximately 600 mm. Hg for 1 to 20 seconds; drying said impregnated color support in two stages, the first stage using diffusion-filtered infrared heat, and the second stage hot air; said color support now containing 40 to 100 percent by weight impregnating resin, calculated on the cellulose present; simultaneously precondensing said color support to the B-stage; replenishing the moisture content of said color support, which had become brittle, by steaming, to restore the necessary flexibility and immediately applying the color support to a blank, pre-condensed to the B-stage, the print of said color support facing said blank, which had been made of a resin selected from the group consisting of melamine-formaldehyde, urea-formaldehyde and phenol-formaldehyde and containing fillers; and terminating the condensation of both color support and blank simultaneously under pressure and heat to the C-stage; whereby the color support combines with said blank to form an integral and indivisible unit, fully protected against mechanical and chemical influences.

2. The process as defined in claim 1, wherein to said impregnating solution 0.5 to 2.0 percent by weight, calculated on the resin present, chloroacetamide are added as catalyst in form of a 5 to 10 percent solution.

3. The process as defined in claim 1, wherein the printed and impregnated color support, prior to its combination with the blank, is pre-shaped to fit the contours of the blank by lateral expansion of the support without creasing and folding of the same.

4. The process as defined in claim 1, wherein said color support, after impregnation, but prior to complete drying, is corrugated to secure a uniform surface.

References Cited by the Examiner
UNITED STATES PATENTS

| | | | |
|---|---|---|---|
| 1,803,926 | 5/31 | Vedder | 100—160 |
| 2,149,507 | 3/39 | Camfield | 156—228 |
| 2,276,567 | 3/42 | Donaldson | 156—224 |
| 2,394,941 | 2/46 | Smith | 18—19 |
| 2,410,361 | 10/46 | Prance | 156—43 |
| 2,518,565 | 8/50 | Nicolle | 18—19 |
| 2,582,730 | 1/52 | Wohnsiedler et al. | 154—43 |
| 2,591,771 | 4/52 | Bergey | 156—331 |
| 2,646,380 | 7/53 | Barlow et al. | 154—110 |
| 2,817,614 | 12/57 | Fraser | 156—335 |
| 2,833,685 | 5/58 | Lawrence | 154—110 |
| 2,885,954 | 5/59 | Berlyn | 100—160 |
| 2,999,789 | 9/61 | Quinn | 156—331 |

FOREIGN PATENTS

| | | |
|---|---|---|
| 317,217 | 12/56 | Switzerland. |
| 339,096 | 7/59 | Switzerland. |

OTHER REFERENCES

"Laminating With Melamine Resins," an article by T. W. Noble in Plastics, December 1946, pp. 46, 48, 49, 94 and 95.

EARL M. BERGERT, *Primary Examiner.*

CARL F. KRAFFT, *Examiner.*